May 24, 1938.    P. ORR    2,118,619
TRANSMISSION SYNCHRONIZER
Filed July 20, 1936
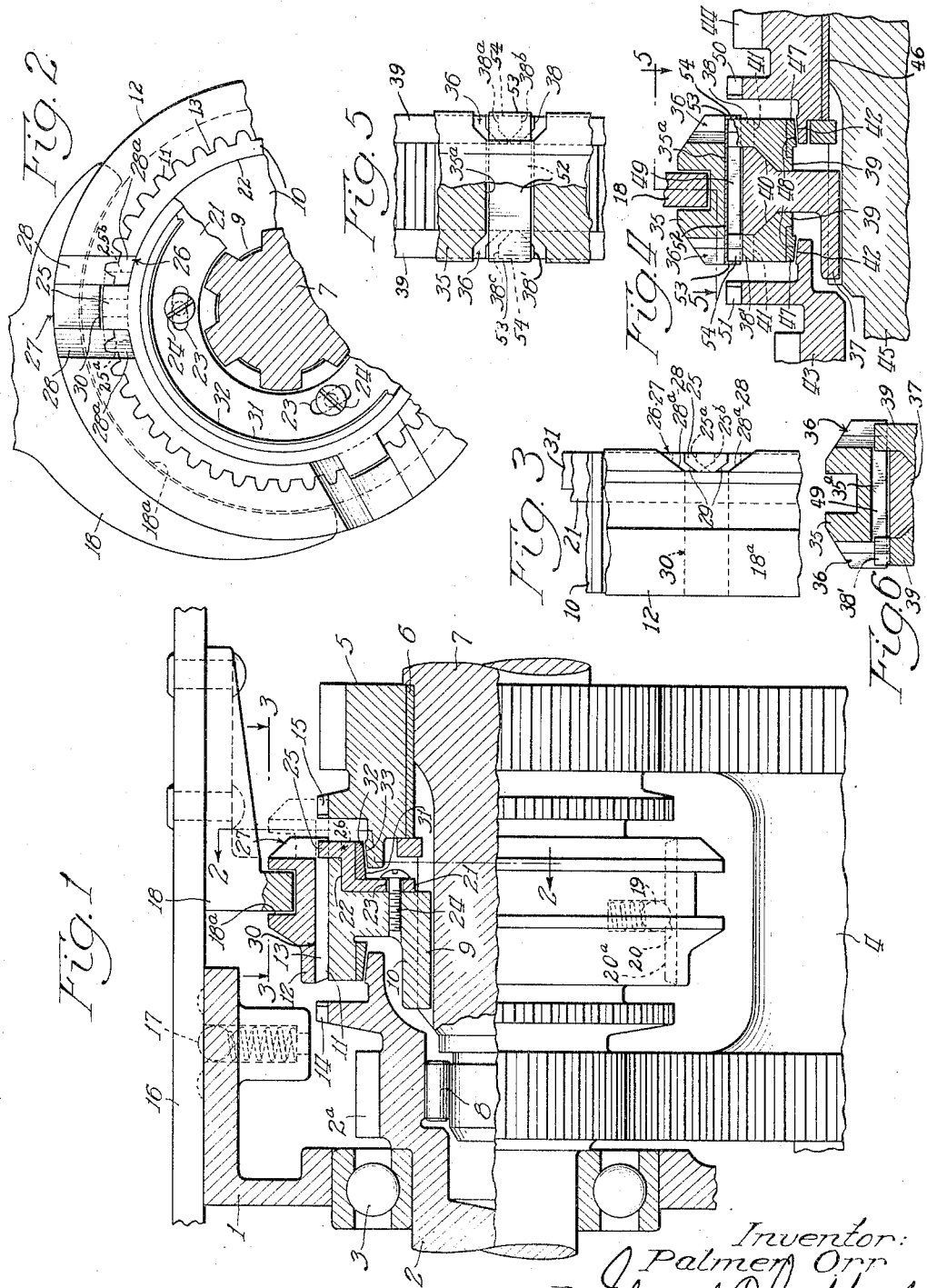
Inventor:
Palmer Orr Patented May 24, 1938

2,118,619

UNITED STATES PATENT OFFICE 2,118,619

TRANSMISSION SYNCHRONIZER

Palmer Orr, Muncie, Ind., assignor to Borg-Warner Corporation, Chicago, Ill., a corporation of Illinois Application July 20, 1936, Serial No. 91,457

3 Claims. (Cl. 192—53)

This invention relates to transmission synchronizers. The invention is concerned more particularly with synchronization of driving and driven transmission elements immediately prior to establishing positive drive therebetween in such manner that clashing of the interengaging positive drive clutch elements may be substantially avoided and their engagement may be effected with despatch.

It is an object of the invention to provide a synchronizing mechanism of such character as to prevent clashing of coupling parts under normal driving conditions.

It is also an object of the invention to provide a synchronizing structure which will insure against coupling action or engagement of clutch teeth prior to substantially complete synchronization of the parts to be coupled together.

A further object of the invention involves the provision of mechanism for speedily synchronizing relatively moving parts.

In accordance with the general features of the invention, there is provided a blocking element which assumes a position obstructing the coupling action upon approach of the relatively moving parts to be coupled under normal driving conditions, and ceases to so obstruct only when the parts are in substantial synchronism.

Other objects and advantages of the invention will appear as the description proceeds.

The invention will be best understood by reference to the following description of the several embodiments thereof, shown in the accompanying drawing, wherein:

Fig. 1 is a longitudinal fragmentary view, partly in section and partly in elevation, of a transmission mechanism embodying the invention;

Fig. 2 is a fragmentary view, partly in section and partly in elevation, taken substantially as indicated by the line 2—2 in Fig. 1;

Fig. 3 is a fragmentary plan view taken substantially as indicated by the line 3—3 in Fig. 1;

Fig. 4 is a fragmentary longitudinal view, partly in section and partly in elevation, of another form of the invention;

Fig. 5 is a fragmentary plan view, partly in section and partly in elevation, taken substantially on the line 5—5 of Fig. 4; and Fig. 6 is a fragmentary view similar to a part of Fig. 4 but showing another form of the invention.

Referring now more particularly to the drawing, in which is illustrated a portion of a transmission such as may be found in automotive vehicles, in conjunction with marine engines, and in fact in any assembly for the transmission of power, there is shown a portion of a frame 1 in which a drive shaft 2 is journaled at 3, a countershaft 4 and a gear 5 receiving torque from the drive shaft 2 through gears on the drive shaft and countershaft, the gear 5 being journaled on a bushing 6 about a driven shaft 7 journaled at 8 in the drive shaft 2. Splined at 9 to the driven shaft 7 intermediate the drive shaft 2 and the gear 5 is a clutch ring 10 arranged to have slight longitudinal floating movement relative to the driven shaft 7. Slidably splined on the outer periphery of the ring 10 at 11 is a clutch collar 12 whose teeth 13 are adapted to be clutched with clutch teeth 14 on the drive shaft 2 to establish a driving connection between the drive shaft 2 and the driven shaft 7 through the clutch ring 10, and with clutch teeth 15 carried by the gear 5 to establish a reduced speed driving connection, through the ring 10, between the gear 5 and the driven shaft 7.

Suitably mounted on the frame or casing 1 is a shift rail 16 of any suitable construction, adapted to be held yieldably in the desired positions of adjustment by the spring pressed plunger 17 engaging in appropriately positioned recesses in the rail, or by any other suitable means. The shift rail 16 carries a fork 18 received in an appropriate groove 18a in the clutch collar 12 for shifting the same.

In synchronizing clutch structures of this general character heretofore in vogue, suitable gripping surfaces have been provided on the parts such as the parts 10 and 5, and relative sliding movement of the clutch collar 12 and ring 10 has been yieldably restrained by means such as a spring pressed ball 19 normally projecting into a groove 20 in one or more of the teeth 13, until the gripping surfaces have established some degree of synchronization.

In practice, however, it has been found that even under normal conditions of driving the shifting force overcomes the restraint due to the spring before substantially complete synchronism and the clutch collar forges on and clashes with the part with which it is intended to be coupled.

In accordance with the present invention, these and other undesirable characteristics attendant upon the use of conventional synchronizing mechanisms have been obviated. To this end, in accordance with the form of the invention shown in Figs. 1, 2 and 3, a blocking ring 21 is secured at one or each side of the clutch ring 10. The blocker 21 is journaled at 22 in the ring 10 and is provided with one or more slots 23 so dimensioned as to permit relative rotation between the parts 10 and 21. The retractor means 24 serves to return the blocker axially with the ring 10 when the latter is returned to neutral position, to prevent accidental drag of the blocker against the cooperating friction surface when the transmission is out of second gear.

Three sets of slots and retractors preferably equally spaced angularly may be employed. The blocker member 21 is provided with one or more outwardly projecting lugs 25 projecting generally radially through adjacent, substantially registered notches 26 and 27 in the ring 10 and collar 12, respectively. The end portions of one or more teeth on the outer periphery of the ring and inner part of the collar are accordingly removed to provide these notches. The notches are wider than the lug 25 to afford limited relative rotation between the blocker 21 and the ring 10. The sidewalls of the notches 27 are tapered at 28, as are also the confronting sides 29 of the lug 25, so that when the lug 25 is in other than its median position (shown in full lines) relative to the ring 10, the lug obstructs one or more of the chamfered adjacent teeth 13 of the collar 12, and while in the obstructing position prevents the collar 12 from moving relative to the ring 10 in the direction of the lug 25.

The collar 12 is provided with a longitudinal internal groove 30 formed by removing one or more teeth 13 and preferably a few thousandths of an inch wider than the lug 25 to provide clearance for each lug, and is adapted to receive the same when the blocker 21 is in its median position aforesaid, which occurs upon substantial synchronization between the shaft 7 and the gear 5 as will appear hereinafter. Thereupon said collar may be shifted longitudinally and coupled with the clutch teeth 15 on the gear 5.

A friction ring 31, of bronze or bronze composition or any other suitable wear resistant friction material, is riveted or otherwise suitably secured to the blocker 21 and has a preferably frusto-conical friction surface 32 engageable with a complemental frusto-conical surface 33 formed on the gear 5 or on a member secured thereto. The juxtaposed ends of the cooperating teeth 13 and 15 are suitably chamfered or rounded to provide such camming as is necessary to enable the teeth to be clutched together notwithstanding any disalignment as the teeth are initially engaged.

By way of example, let us consider the driven shaft 7 to be the transmission main shaft illustrated in S. O. White U. S. Patent No. 1,872,566, issued August 16, 1932, the shaft 2 as the drive shaft, the gear 2a thereon as the drive gear and the gear 5 as the second speed gear, constantly rotated by the drive shaft 2. Let us assume a condition wherein the parts are arranged substantially as shown in Figs. 1, 2 and 3, with the transmission in low gear or in any other condition with the transmission main shaft 7 rotating at a lower speed than the second speed gear 5. For the purpose of shifting into second speed, the low speed drive is released and pressure is applied to the fork 18 in the direction to shift the coupling collar 12 to the right as seen in Fig. 1. Since the ring 10 is floatingly slidable along the transmission main shaft 7, the unit comprising said ring, the blocker 21, friction cone 31 and collar 12 will be moved bodily to the right until the axial clearance between the friction surfaces 32 and 33 is taken up. The obstruction afforded by the friction surface 33, while preventing further sliding of the ring 10, would not prevent continued movement of the collar 12, movement of the latter being merely yieldably resisted by the spring pressed ball 19 in the groove 20. However, due to the frictional engagement at the surfaces 32 and 33, and the fact that the gear 5 and shaft 7 are moving at different speeds (the gear 5 moving faster than the shaft 7 but gradually reducing its speed due to the driver's release of the accelerator upon shift from low to neutral, preparatory to the shift to second speed, while the shaft 7 coasts or free wheels at substantially the same speed at which it was rotating in low), the surface 33 will apply a torque upon the blocker 21 and turn it relative to the ring 10 substantially to the position shown in dotted lines at 25a in Figs. 2 and 3, with one wall 29 of the lug in engagement with the adjacent wall 28 of the notch 27 in the coupling collar 12.

As long as the gear 5 rotates faster than the shaft 7, the torque applied to the friction ring 31 will maintain the lug 25 in the position 25a, where, as has been explained, the lug obstructs the juxtaposed ends of the teeth 13 of the collar 12 and thus substantially prevents movement of the collar 12 toward teeth 15 on the gear 5. During normal conditions of driving, the greater the force applied to the collar 12 tending to effect a coupling thereof with the teeth 15, the greater will be the obstructive force exerted by the lug 25, and the greater will be the grip between the surfaces 32 and 33, and consequently the quicker the synchronization of said surfaces will occur. Of course, inasmuch as the engine clutch is released, the gear 5 rapidly slows down, thereby additionally hastening synchronization.

It will be appreciated that, once synchronization has been reached, the gear 5 tends to slow down further because of friction, so that immediately following the instant of synchronization, the surface 33 exerts upon the blocker a torque which is opposite in direction to the torque previously applied thereto, with the result that the blocker is now shifted relative to the ring 10 toward the position shown in full lines, with each lug 25 in registration with the longitudinal groove 30 in the clutch collar 12. During this shift of the blocker, pressure is continuously applied from the collar 12 against the lug 25, so that as soon as this shift commences, the groove 30 receives the reduced part of the lug, and as such shift is continued, the lug recedes further rotatively from the notch wall 28 appearing lowermost in Fig. 3, and therefore permits further approach of the collar 12 toward the teeth 15, the groove 30 receiving more and more of the lug.

As soon as complete registration of the groove and lug occurs, the lug ceases to obstruct any of the teeth of the collar 12 so that the latter is free to move without interference in the direction of the teeth 15 and to interlock therewith, thereby positively coupling together the ring 10 and gear 5 and establishing second speed drive. When the collar 12 has reached the coupling position, shown dotted in Fig. 1, pressure thereon is released, and thereafter the ring 21 is controlled longitudinally relative to the collar 12 by the friction due to pressure of the ball 19 on the straight edge portion 28a of the associated collar tooth 13.

The amount of movement of the collar 12 to effect its proper engagement with the teeth 15 is such that when clutch engagement occurs the plunger 19 is still in engagement with a tooth of the collar 12.

When the parts are in the relation shown in Fig. 1, with the lug 25 in its median or neutral position offering no obstruction to the movement of the collar 12, the spring pressed plunger 19 in the recess 20 prevents the collar 12 from accidentally moving longitudinally relative to the ring 10. When the collar 12 is initially moved toward the teeth 15, pressure is transmitted by a wall portion of the recess 20, engaging the ball 19, to the friction surface 32, causing the latter to be engaged with the surface 33 to commence the synchronizing operation. It is only after perfect synchronism is effected that the lug 25 is fully registered with the groove 30 and, at such time, the continued shifting pressure upon the collar 12 overcomes the pressure of the spring pressed ball 19 and forces the latter out of the recess 20.

Consideration has been given to the mode of operation of the invention insofar as the shift from a lower speed to second is concerned. Following release of the coupling between the high speed coupling teeth 14 and the collar 12, in the shift from high to second, it will be evident that due to the fact that the main shaft 7 will be proceeding under the momentum of the vehicle at a higher speed than the engine will be driving the second speed gear 5, the torque by the gear surface 33 upon the blocker ring surface 32 will be in a direction opposite to that exerted when changing from low to second, so that, relative to the ring 10, the lug 25 will occupy a position indicated by the dotted lines at 25b in Figs. 2 and 3. As before, the lug in this position will prevent the collar 12 from moving into engagement with the teeth 15 until after synchronism has been reached and momentarily passed, the gear 5 being then rotated momentarily faster than the shaft 7 until the lug no longer obstructs the collar and the latter is thereupon free to shift longitudinally into engagement with the teeth 15.

While the blocker mechanism is illustrated in Fig. 1 as applied only to the second speed side of the ring 10, the high speed synchronizer cone surfaces being without such mechanism, it is to be appreciated that it could well be provided on the high speed side or on both sides of the ring 10.

The blocker 21 has a slight axial clearance as shown in Fig. 1 to insure relative rotation, yet is retained by the screws 24 against accidental drag against the surface 33 when the transmission is out of second gear.

In Figs. 4, 5 and 6, modified forms of the invention, affording blocker mechanism for both second and high speeds, are illustrated. Accordingly it will be appreciated that the collar 35 is provided with a longitudinal inner opening 35a and is formed at both ends with generally radial notches 36 corresponding with the notches 27 of the form of the invention previously described. The clutch ring 37 is similarly notched for registration with the notches 36 and for receiving the lugs 38 and 38' of blocker rings 39 capable, because of the greater width of the notches, of limited rotary movement relative to the clutch ring 37. The blockers 39 have sliding rotation in the ring 37 and bear upon the ring 37 along frusto-conical surfaces 40 and outwardly disposed substantially cylindrical surfaces 41. The engaging surfaces between the blockers 39 and the ring 37 and collar 35 are preferably so formed as, and sufficient clearance is provided, to obviate any tendency to stick. The blockers are rotatively floatingly supported by the ring 37. They may be capable of slight axial movement with the ring 37, limited by the proximity of the axially relatively fixed frusto-conical surfaces 42 of the transmission drive shaft 43 and the second speed gear 44, respectively. The gear 44 may be journaled on the transmission main shaft 45, and the bushing 46 may be suitable for this purpose. The blocker rings 39 are preferably provided with bronze or other suitable friction insert rings 47 riveted or otherwise suitably secured in place and having friction surfaces 48 complemental with the surfaces 42 and cooperative therewith to effect synchronization in substantially the same way in which the surface 32 cooperates with the surface 33 in Fig. 1.

From the explanation already given in connection with Fig. 1, it will be appreciated that, in connection with the forms shown in Figs 4, 5 and 6, when the shift is commenced from low to second, the lug 38 initially will be shifted, relative to the ring 37 and collar 35, to the position shown in dotted lines at 38a in Fig. 5 before reversing and being received in the groove 35a, and when the shift is from high to second, the lug 38 initially will be shifted, relative to said ring and collar, to the position shown in dotted lines at 38b before reversing and being received in the groove 35a. It also follows from said previous explanation that when the shift is to high from a lower speed, the left lug 38' will be shifted initially, relative to said ring and collar, to the position shown in dotted lines at 38c before reversing and being received in the groove 35a. In the establishment of second speed, the internal teeth 49 of the collar 35 will engage the teeth 50 associated with the second speed gear 44, and in the establishment of high speed, the internal teeth 49 will engage the teeth 51 associated with the drive shaft 43.

Although the walls of the notches 26 and 27 in the first described form of the invention are substantially flat throughout, they may be made angular as shown in Figs. 4, 5 and 6, in complement to the correspondingly formed and juxtaposed walls of the lugs 38 and 38'. These lugs, moreover, preferably project into the groove 35a to assist in telescoping the lugs fully into the groove as the occasion may require.

In order to prevent rattling or any undesired drag between the surfaces 42 and 48, a retractor clip 52 for substantially preventing relative longitudinal movement between the rings 39 and the ring 37 is provided. The clip may be of any desired construction, and for purposes of illustration is shown to comprise a strip of any suitable material such as metal. It is preferably so dimensioned as to be freely movable in the groove 35a, and permit free relative rotation of the lugs 38 and 38' and the associated parts, and has end walls 53 engaging the outer end walls 54 of the lugs.

The clip, as will readily be observed, is applied by merely slipping the same over the lugs 38 and 38' prior to assembly with the collar 35 and after the blockers 39 are assembled with the ring 37, with the end walls of the clip engaged with the outer end walls of the lugs. The lugs may project radially less than the outer teeth of the ring 37, if desired, to enable such teeth to assist in holding the clip in place. Thereafter this assembly is slipped into the collar 35 in the relation shown in Figs. 4, 5 and 6.

Fig. 6 shows substantially the same construction as Figs. 4 and 5 but with the retractor clip 52 omitted.

It will be observed that the invention is applicable to brakes as well as clutches.

It will be understood that the tooth coupling occurs immediately following synchronization, before any substantial speed difference occurs, so that the coupling is effected freely and without clashing. The adjacent teeth ends are preferably chamfered or rounded to facilitate coupling of initially disalined coupling teeth.

The cone rings are preferably of bronze for engagement with the preferably steel or other relatively obdurate or hard cooperating surfaces associated with the gears, due to the high coefficient of friction afforded.

The blocker lug portion of each blocker ring is preferably of steel or other suitable obdurate material resistant to bending and other stresses to which the lug is subjected in the synchronizing and coupling operations.

The gearing may be of the spiral or any other suitable type if desired.

The invention is fully applicable to automatic and part-automatic as well as hand shift power transmission or absorption mechanism.

When the shift is from high to second, coupling may be speeded up by speeding up the drive shaft 2 as soon as the lug obstructs further longitudinal movement of the clutch collar. This speeding up of the drive shaft will speed up the second speed gear and hence hasten the synchronization and subsequent reception of the lug in the collar groove, where the lug no longer obstructs the collar. Of course, even without this speeding up, the coupling will be effected with despatch.

It will be seen from the foregoing that in accordance with the invention under normal driving conditions silent shift to couple relatively rotating parts may be accomplished, and in addition the synchronization is both speeded up and made positive prior to interengagement of the coupling teeth.

When the invention is employed in connection with the maximum speed drive, or as a brake, it is clear that the lug will be moved on only one side of its neutral position and hence the notches in the clutch ring and associated collar may be shaped to extend only on one side of the groove 30 or 35a, as the case may be, at the high speed end associated with the drive shaft in the instant drawing, for example.

In a structure embodying this invention, synchronization is effected so quickly that for practical purposes the entire shift of the coupling collar member is substantially continuous.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a transmission synchronizing mechanism, separable torque-transmitting parts adapted to be drivably coupled together, a synchronizing member having a rotary lost motion relation with one of said parts, and a synchronizing member substantially fixed to the other part, a coupling device slidably splined to one of said parts and having a longitudinal groove adapted to receive a portion of the first member as said device is moved into coupled relation to the other part, and a retractor clip extending in said groove and embracing said first part and said first member for retracting said first member out of engagement with the second member upon retraction of said device.

2. In a transmission synchronizing mechanism, separable torque-transmitting parts adapted to be coupled together, a synchronizing member on one of said parts, a synchronizing member fixed to the other of said parts, a coupling device slidably splined to one of said parts and having a longitudinal groove adapted to receive a portion of the first member as said device is moved into coupled relation to the other part, and means extending in said groove and embracing said first part and said first member for retracting said first member out of engagement with the second member upon retraction of said device.

3. In a transmission synchronizing mechanism, separable torque-transmitting parts adapted to be coupled together, a synchronizing member on one of said parts, a synchronizing member fixed to the other of said parts, a coupling device slidably splined to one of said parts and having a longitudinal groove adapted to receive a portion of the first member as said device is moved into coupled relation to the other part, and a clip extending in said groove and having depending ends, said ends including between them said first part and said first member for retracting said first member out of engagement with the second member upon retraction of said device.

PALMER ORR.